(12) United States Patent
Jude

(10) Patent No.: US 8,833,521 B1
(45) Date of Patent: Sep. 16, 2014

(54) ROTATABLY-ENGAGED TREE STAND AND LADDER FOR ACCESS THERE WITH

(76) Inventor: Troy L. Jude, Lagrange, OH (US)

( * ) Notice: Subject to any disclaimer, the term of this patent is extended or adjusted under 35 U.S.C. 154(b) by 298 days.

(21) Appl. No.: 13/430,856

(22) Filed: Mar. 27, 2012

(51) Int. Cl.
*A01M 31/02* (2006.01)

(52) U.S. Cl.
CPC .................................... *A01M 31/02* (2013.01)
USPC .............. 182/128; 182/12; 182/187; 182/188

(58) Field of Classification Search
CPC ............. E04G 1/36; E04G 1/362; E04G 3/24; E04G 3/243; E04G 3/28; B66B 9/08; B66B 9/087; A01M 31/02
USPC ............... 182/12, 13, 15–17, 36, 38, 39, 128, 182/187, 188; 187/201
See application file for complete search history.

(56) References Cited

U.S. PATENT DOCUMENTS

| | | | | |
|---|---|---|---|---|
| 1,623,821 | A * | 4/1927 | Westfield | 182/12 |
| 2,405,259 | A * | 8/1946 | Lamb | 182/38 |
| 2,645,531 | A * | 7/1953 | Rector | 182/37 |
| 2,844,187 | A * | 7/1958 | Scoville | 104/93 |
| 3,347,339 | A * | 10/1967 | Coole | 182/14 |
| 3,960,242 | A * | 6/1976 | Saxonmeyer | 182/36 |
| 4,125,172 | A * | 11/1978 | Hatala | 182/19 |
| 4,163,480 | A * | 8/1979 | Highland | 182/14 |
| 4,300,657 | A * | 11/1981 | Thompson | 182/38 |
| 4,396,092 | A * | 8/1983 | Thompson | 182/38 |
| 4,570,749 | A * | 2/1986 | McKibbin | 182/36 |
| 4,601,364 | A * | 7/1986 | York | 182/187 |
| 4,773,504 | A * | 9/1988 | Reed et al. | 182/38 |
| 5,241,772 | A | 9/1993 | Hall | |
| 5,348,119 | A * | 9/1994 | Filkins | 182/187 |
| 5,655,623 | A * | 8/1997 | Skyba | 182/116 |
| 5,996,738 | A | 12/1999 | Nelsen | |
| 6,053,282 | A | 4/2000 | Morisak | |
| 6,170,609 | B1 * | 1/2001 | Dech | 182/187 |
| 6,719,093 | B2 * | 4/2004 | Garbs | 182/116 |
| 6,725,972 | B1 * | 4/2004 | Krier et al. | 182/187 |
| 7,139,357 | B2 * | 11/2006 | Colditz et al. | 376/260 |
| D558,897 | S | 1/2008 | Smith | |
| 8,042,652 | B2 * | 10/2011 | Weir | 182/116 |
| 8,540,052 | B1 * | 9/2013 | Brown | 182/115 |
| 2001/0037914 | A1 * | 11/2001 | Preusser et al. | 182/150 |
| 2008/0169156 | A1 | 7/2008 | Leishman et al. | |
| 2009/0229917 | A1 * | 9/2009 | Berkbuegler | 182/113 |
| 2009/0301812 | A1 * | 12/2009 | Kerr | 182/39 |
| 2010/0300806 | A1 | 12/2010 | Ash | |
| 2011/0297481 | A1 * | 12/2011 | Copus | 182/113 |

OTHER PUBLICATIONS www.topratedadventures.com. KT-30 Tree Stand.

* cited by examiner

*Primary Examiner* — Alvin Chin-Shue
*Assistant Examiner* — Colleen M Chavchavadze
(74) *Attorney, Agent, or Firm* — Kyle A. Fletcher, Esq.

(57) ABSTRACT

The rotatably-engaged tree stand and ladder for access there with includes a pair of track straps that install around an outer surface of an existing tree, and which are generally parallel with one another. A seat and foot base may attach onto the pair of tracks, and are able to roll around the track and tree. A handle strap including a plurality of handles attaches onto an outer surface of an existing tree, and which is positioned above the pair of tracks so as to enable an occupant to manually move the seat and foot base along the track. The seat and foot base enable the occupant to look outwardly with respect to said tree. A ladder extends up from the ground to a height upon said tree, which shall be below the track straps to provide clearance for the seat and foot base.

17 Claims, 4 Drawing Sheets

ROTATABLY-ENGAGED TREE STAND AND LADDER FOR ACCESS THERE WITH

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of tree stands, more specifically, a tree stand that can rotate around the tree to provide less than 360 degrees of applicable tree stand access.

B. Discussion of the Prior Art

As will be discussed immediately below, no prior art discloses a rotatable tree stand that includes a rotatable tree stand that includes a pair of track straps that encircle a tree, and which are generally parallel with one another such that a seat and foot base may attach and rotate around said tree; wherein a handle strap is included and encircles the tree above the tracks, and includes a plurality of handles that provide a manual means of moving the seat and foot base with respect to the track and tree; wherein a ladder extends from the ground up to a height upon said tree, which is below the tracks; wherein a plurality of straps securedly affix said ladder to said tree; wherein the handle strap and track straps include a ratchet to adjust the circumference in order to accommodate varying tree sizes; wherein the seat and foot base enable an occupant 150 to both sit down and rest one's feet without dangling from above, and also enable the occupant to look outwardly with respect to said tree.

The Ash Patent Application Publication (U.S. Pub. No. 2010/0300806) discloses a tree stand comprising a seat that may be rotated about a 360-degree range of motion. However, the seat rests atop a stand that is mounted onto a tree, and is not seat with foot base both of which revolve around a track that attaches onto an outer surface of a tree.

The Hall Patent (U.S. Pat. No. 5,241,772) discloses a cylindrical hunting blind with a swivel chair movably mounted in the enclosure capable of revolving 360 degrees about the center of the enclosure. However, the cylindrical hunting blind is not a tree stand that provides for manual rotation of a seat and foot base around a pair of tracks that encircle a tree.

The Leishman et al. Patent Application Publication (U.S. Pub. No. 2008/0169156) discloses a hunting tree stand having a pivot structure about which the seat rotates in a side to side movement around the tree trunk. However, the hunting tree stand only provides for rotational movement about a fixed point aside from a tree, and does not enable a seat and foot base to roll around a track that encircles a tree.

The Morisak Patent (U.S. Pat. No. 6,053,282) discloses a portable deer stand having a platform member that carries a fixed stable axis of rotation to which a chair may be detachably mounted upon. Again, the portable deer stand is not a system that is attached onto an existing tree, and which provides a seat and foot base that can roll around a track that encircles a tree.

The Nelsen Patent (U.S. Pat. No. 5,996,738) discloses a portable tree stand with a rotating seat. However, the tree stand and rotating seat do not ride on a track, which encircles a tree, and which orients an occupant 150 outwardly with respect to said tree.

The Smith Patent (U.S. Pat. No. Des. 558,897) illustrates a design for a tree stand, which does not depict a seat and foot base that roll upon a track that encircles a tree.

The KT-30 Tree Stand is a non-patent piece of prior art located on www.topratedadventures.com, discloses a tree stand that attaches to a tree, and which enables a seat to rotate 360 degrees with respect to the seat support. However, the seat only rotates around itself, and not around a track that encircles a tree.

While the above-described devices fulfill their respective and particular objects and requirements, they do not describe a rotatable tree stand that includes a pair of track straps that encircle a tree, and which are generally parallel with one another such that a seat and foot base may attach and rotate around said tree; wherein a handle strap is included and encircles the tree above the tracks, and includes a plurality of handles that provide a manual means of moving the seat and foot base with respect to the track and tree; wherein a ladder extends from the ground up to a height upon said tree, which is below the tracks; wherein a plurality of strap's securedly affix said ladder to said tree; wherein the handle strap and track straps include a ratchet to adjust the circumference in order to accommodate varying tree sizes; wherein the seat and foot base enable an occupant to both sit down and rest one's feet without dangling from above, and also enable the occupant 150 to look; outwardly with respect to said tree. In this regard, the rotatably-engaged tree stand and ladder for access there with departs from the conventional concepts and designs of the prior art.

SUMMARY OF THE INVENTION

The rotatably-engaged tree stand and ladder for access there with includes a pair of track straps that install around an outer surface of an existing tree, and which are generally parallel with one another. A seat and foot base may attach onto the pair of tracks, and are able to roll around the track and tree. A handle strap including a plurality of handles attaches onto an outer surface of an existing tree, and which is positioned above the pair of tracks so as to enable an occupant to manually move the seat and foot base along the track. The seat and foot base enable the occupant to look outwardly with respect to said tree. The track straps and the handle strap include a ratchet to adjust the circumference for accommodating varying tree sizes. A ladder extends up from the ground to a height upon said tree, which shall be below the track straps to provide clearance for the seat and foot base.

It is an object of the invention to provide, a tree stand inclusive of a seat and foot base that can roll along a track that encircles an outer surface of a tree such that the occupant can look outwardly with respect to the tree while enabling manual movement of the seat and foot base upon said track.

Another object of the invention is to include a handle strap that is positioned above the track straps, and which enables an occupant to manually move the seat and foot base along the track in order to adjust the position of the seat and foot base around the tree.

An even further object of the invention is to provide track straps and a handle strap that include a ratchet to provide for adjustment of the circumference of each strap with respect to varying tree size.

A further object of the invention is to provide a seat and foot base that support an occupant both as a seat and a foot rest while enabling the occupant to look outwardly with respect to the tree affixed there against.

A further object of the invention is to provide a foot base that includes a plurality of openings therein, which enable an occupant to see under one's feet.

A further object of the invention is to provide a ladder that extends from the ground up to a height upon said tree below the track straps, which provides clearance of the seat and foot base.

Another object of the invention is to provide straps that secure the ladder with respect to the tree so as not to fall down while leaving the occupant stranded at an elevation on said tree.

These together with additional objects, features and advantages of the rotatably-engaged tree stand and ladder for access there with will be readily apparent to those of ordinary skill in the art upon reading the following detailed description of presently preferred, but nonetheless illustrative, embodiments of the rotatably-engaged tree stand and ladder for access there with when taken in conjunction with the accompanying drawings.

In this respect, before explaining the current embodiments of the rotatably-engaged tree stand and ladder for access there with in detail, it is to be understood that the rotatably-engaged tree stand and ladder for access there with is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the rotatably-engaged tree stand and ladder for access there with.

It is therefore important that the claims be regarded as including such equivalent construction insofar as they do not depart from the spirit and scope of the rotatably-engaged tree stand and ladder for access there with. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
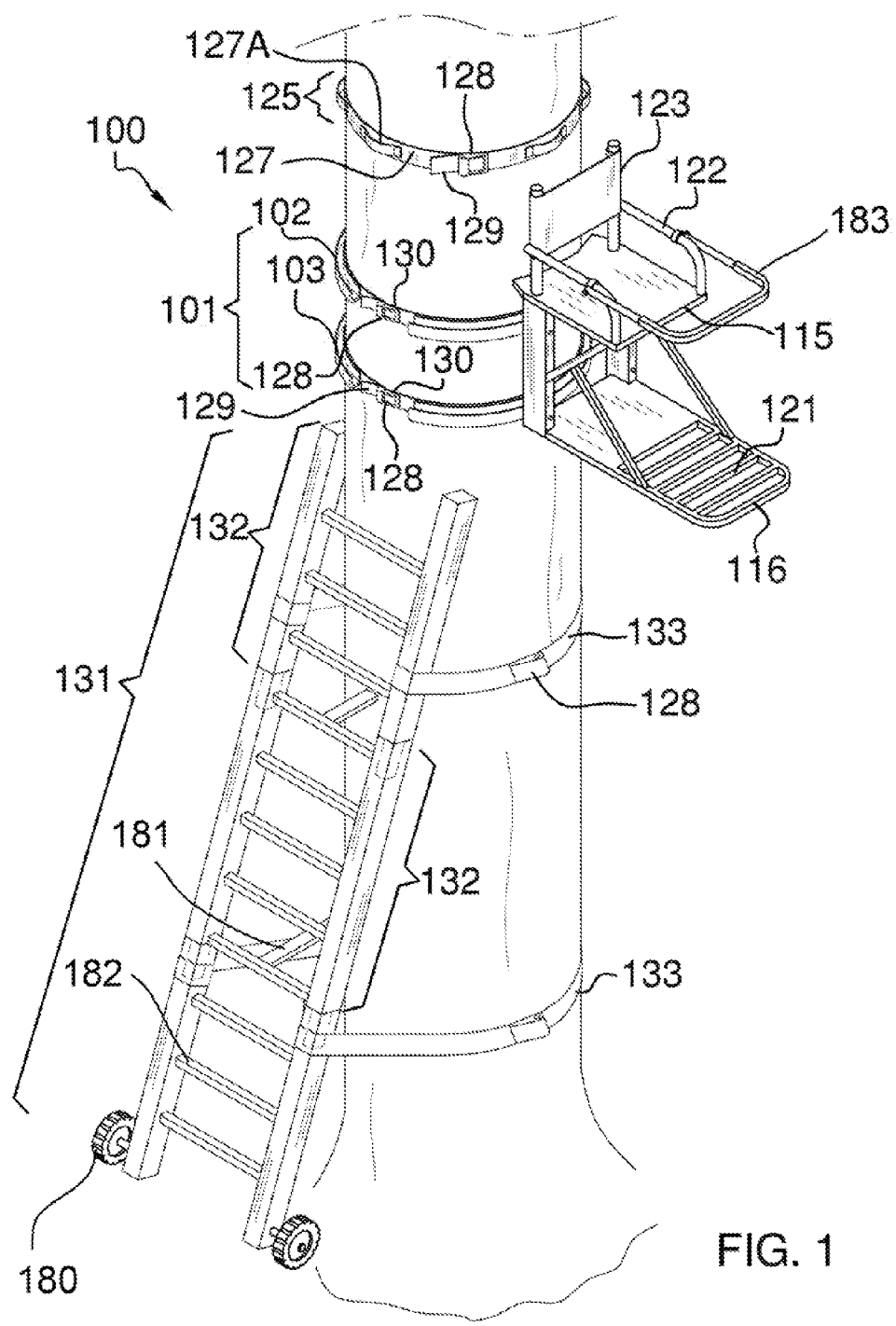
FIG. 1 illustrates a perspective view of the rotatably-engaged tree stand and ladder for access there with installed upon a tree.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, theory presented in the preceding technical field, background, brief summary or the following detailed description.

Detailed reference will now be made to the preferred embodiment of the present invention, examples of which are illustrated in FIGS. 1-5. A rotatably-engaged tree stand and ladder for access there with 100 (hereinafter invention) includes a pair of track straps 101, which may be further defined as a top track strap 102 and a bottom track strap 103. The track straps 101 are generally parallel with one another, and encircle a tree 140 at a height 141 above a ground surface 142. It shall be further noted that the top track strap 102 is separated from the bottom track strap 103 by a track distance 104.

The track straps 101 are further defined as a track member 105 affixed to a flexible strap member 106 by a fastening means 107. The fastening means 107 may comprise rivets, screws, adhesive, bolts and nuts. The track member 105 is actually a "U" shaped member that when encircling the tree 110 shall provide a means within which a wheel 120 can roll thereon.

Figure 2:
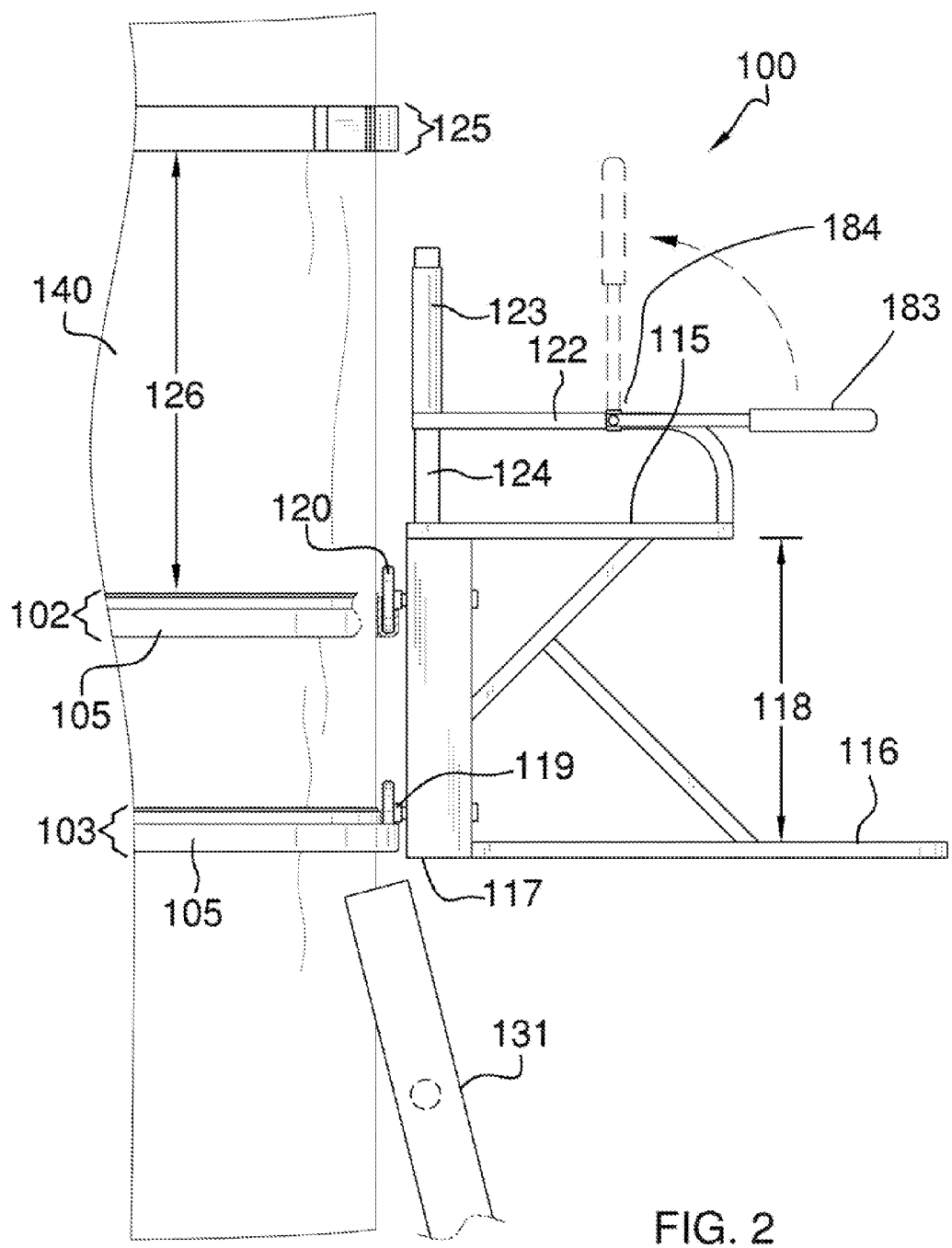
FIG. 2 illustrates a side view detailing the track straps and handle strap secured around said tree while depicting wheels extending from a rear of said seat and foot base, which engage and roll upon said track.
Figure 3:
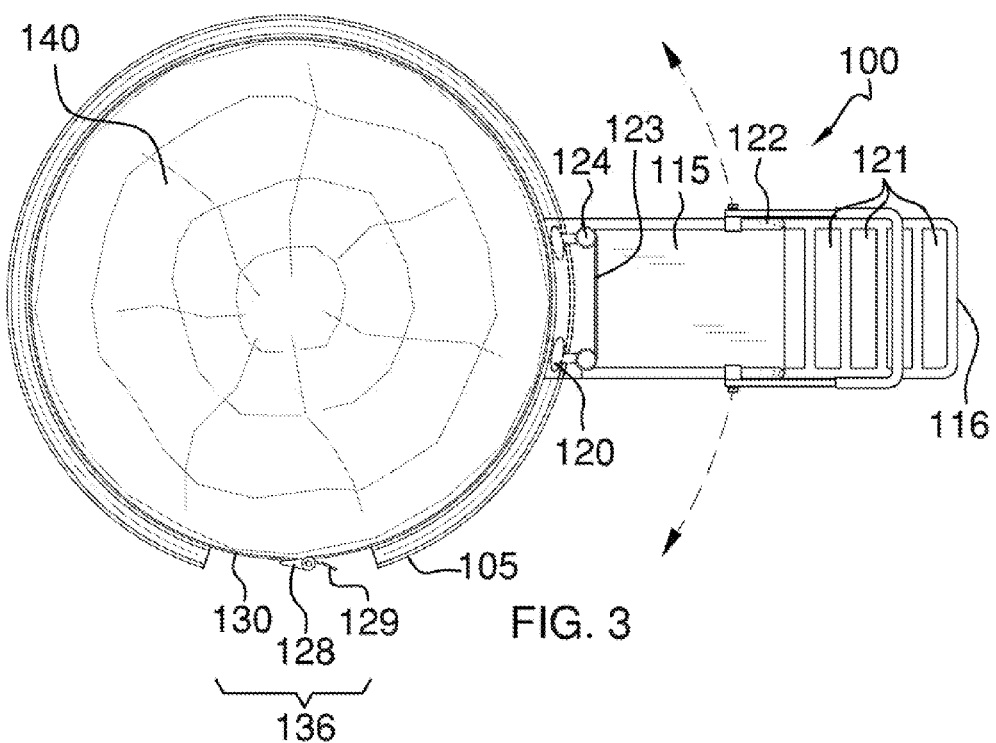
FIG. 3 illustrates a top view of the rotatably-engaged tree stand and ladder installed around a tree and detailing the rotational movement of the seat and foot base along the track while encircling the tree.
Figure 4:
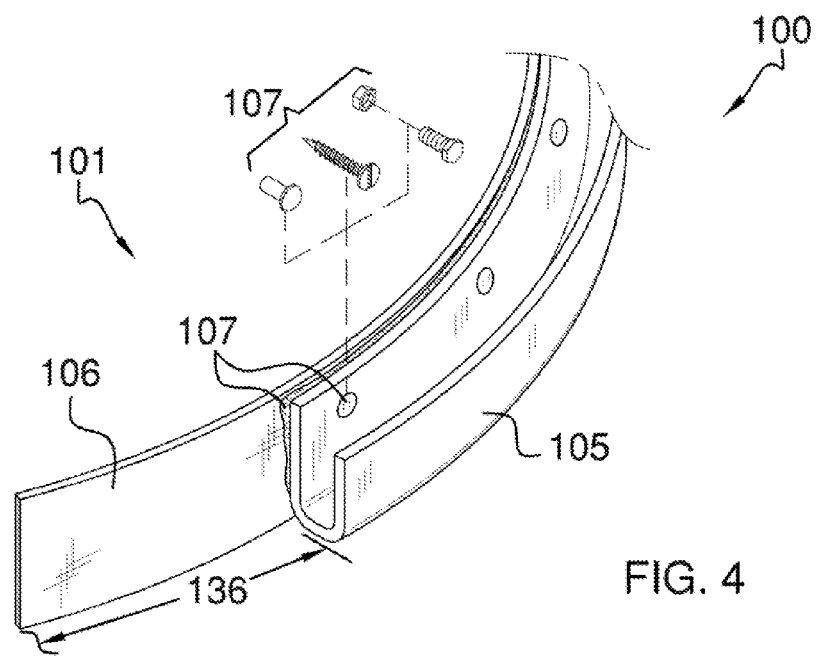
FIG. 4 illustrates a detailed view of one of the track straps in which the track is attached to a strap.
Figure 5:
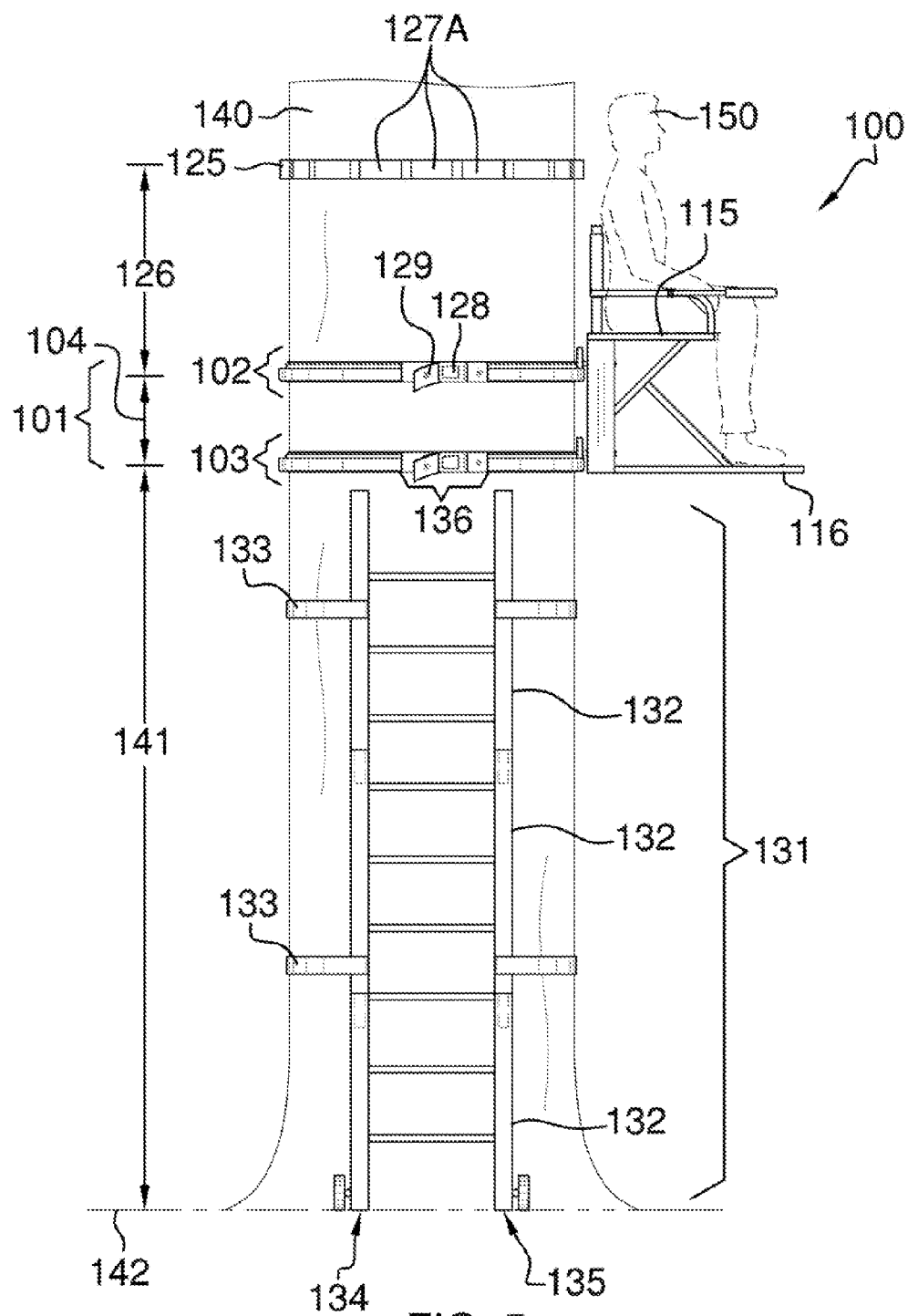
FIG. 5 illustrates a side view of the rotatably-engaged tree stand and ladder for access there with installed on a tree, and detailing the ladder extending up from the ground to a height on said tree just below the track straps.

The invention 100 includes a seat 115 and foot base 116, which attaches onto the track straps 101, and can roll thereon via wheels 120 that extend from a rear surface 117. Referring to FIG. 2, the seat 115 and the foot base 116 collectively form a single piece that attaches onto the track straps 101, and collectively roll thereon. The rear surface 117 supports the seat 115 and the foot base 116 at a perpendicular orientation with respect to the rear surface 117. Moreover, the seat 115 and the foot base 116 are generally parallel with one another, and are separated by a foot base distance 118. The wheels 120 attach to the rear surface 117 via roller bearings 119, which enable the wheels 120 to rotate freely, and more importantly, enable the wheels 120 to roll along the track members 105 of the track straps 101.

It shall be noted that the foot base 116 may include a plurality of holes 121 thereon, which enable an occupant 150 to see under his or her feet. The foot base 116 and the seat 115 shall be made of a lightweight, yet durable material that can support the weight of the occupant 150 when in use.

It shall be noted that the seat 115 may include armrests 122 and a seat back 123, which provide for a more comfortable seat for the occupant 150. The seat back 123 extends up from the rear surface 117 via a vertical member 124.

The invention 100 includes a handle strap 125 that encircles the tree 140 at a handle distance 126 above the top track strap 102. The handle strap 125 is further defined as a flexible strap member 127 from which a plurality of handle members 127A adorn an outer surface, and which are easily grabbed by the occupant 150. The handle members 127A are each a loop made of the same material as the flexible strap member 127, and are equally spaced along a circumference of the handle strap 125 such that each handle member 127A is equally spaced around the tree 140 when in use.

It is important to note that the track straps 101 and the handle strap 125 attach around the outer surface of the tree 140 with no damage to the outer surface of the tree 140. The flexible strap members 106 and 127 each include a ratchet 128, which enables a first end 129 of each flexible strap member 106 and 127 to attach therewith, and adjust a circumference to accommodate different tree sizes. It shall be noted that the ratchet 128 attaches to a second end 130 of each flexible strap member 106 and 127.

It shall be duly noted that the invention 100 may involve track members 105 that do not completely encircle the tree 140, and therefore accommodate and provide clearance for the ratchets 128 of the respective flexible strap member 106.

The invention 100 may further include a ladder 131 comprised of a plurality of ladder sections 132 that attach to one another to form the overall ladder 131. The ladder 131 shall be secured to the tree 140 via a plurality of ladder straps 133 that extend from a first side 134 of the ladder 131 around the tree 140, and which attach to a second side 135 of the ladder 131. Referring to FIG. 1, it shall be noted that the ladder straps 133 may include ratchets 128 to adjust the overall circumference of the ladder straps 133 and the ladder 131 in noted that the ladder 131 shall lean up from the ground surface 142 to just underneath of the bottom track strap 103. Moreover, the ladder 131 shall lean upon the tree 140 to a height less than the height 141 formed between the ground surface 142 and the bottom track strap 103.

The ladder 131 may include ladder wheels 180 that are affixed underneath the first side 134 and the second side 135. Moreover, the ladder wheels 180 enable the ladder 131 to be rotated around the tree 140 as needed, and also to roil the ladder 131 up to the tree 140 for use therewith.

The ladder 131 may further include, ladder arm braces 181 that extend from the ladder 131 and engage an outer surface of the tree 140. The ladder arm braces 181 provide more stability to the ladder 131 when in use. The ladder arm braces 181 shall attach to a respective rung 182 of the ladder 131, and extend inwardly to engage upon the outer surface of the tree 140.

The ladder 131 enables the occupant 150 to climb up and down the tree 110 in order to climb onto or climb off of the seat 115 and the foot base 116 of the invention 100. It shall be further noted that the ladder 140 shall be aligned with and placed under the portion of the track straps 101 where the track members 105 begin and end. It shall be noted that a gap 136 formed between the beginning and end of the track members 105 is the location under which the ladder 131 shall rest against the outer surface of the tree 140.

It shall be further noted that the occupant 150 is seated on the seat 115 with feet resting upon the foot base 116. Moreover, the occupant 150 is seated on the seat 115 and is looking away from the tree 140, which is at the occupant's 150 back. It shall be further noted that when the occupant 150 is seated on the seat 115, the occupant 150 shall have to reach from his/her rear to grab onto one of the handle members 127A in order to move the seat 115 and the foot base 116 along the track members 105, and more importantly, to move the seat 115 and the foot base 116 around the tree 140.

The armrests 122 may include a shooting rail 183 that extends outwardly in front of the seat 115 in order to provide a surface with which to rest a rifle or firearm upon when in use for hunting. Moreover, the shooting rail 183 is well-known in the art as it applies to tree stands, generally. Referring to FIG. 2, the shooting rail 183 is able to rotate about a pivot point 184.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize, numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalent.

The inventor claims:

1. A rotatably-engaged tree stand and ladder for access there with comprising:
a pair of track straps that attach onto and encircle an outer surface of a tree at a height above ground, and upon which a seat and foot base roll thereon via wheels extending from a vertical member;
wherein the seat and foot base are further defined with a rear surface;
wherein a handle strap attaches onto and encircles said tree above the track straps;
wherein the handle strap provides a plurality of handle members thereon, which is configured to be grasped via an occupant whom uses said handle members of the handle strap to manually roll the seat and foot base along the track straps so as to provide rotational movement of the seat and foot base around said tree;
wherein the track straps are further defined as a top track strap and a bottom track strap, which are generally parallel with one another;
wherein the track straps are further defined as a track member affixed via a fastening means to a flexible strap member; wherein the track member has a "U" shape upon which wheels of the vertical member of said seat and foot base can roll therein.

2. The rotatably-engaged tree stand and ladder for access there with as described in claim 1 wherein the top track strap is separated from the bottom track strap by a track distance.

3. The rotatably-engaged tree stand and ladder for access there with as described in claim 1 wherein the seat and the foot base are generally parallel with one another, and are separated by a foot base distance.

4. The rotatably-engaged tree stand and ladder for access there with as described in claim 1 wherein the foot base includes a plurality of holes thereon, which enable said occupant to see under his or her feet.

5. The rotatably-engaged tree stand and ladder for access there with as described in claim 1 wherein the handle strap is generally parallel with the track straps; wherein the handle strap is located at a handle distance above the top track strap.

6. The rotatably-engaged tree stand and ladder for access there with as described in claim 5 wherein the track straps and the handle strap each include a ratchet, which enables adjustment of a circumference of the track straps and handle strap around the tree.

7. The rotatably-engaged tree stand and ladder for access there with as described in claim 1 wherein a ladder extends from a ground surface and rests against the tree under the bottom track strap.

8. The rotatably-engaged tree stand and ladder for access there with as described in claim 7 wherein the ladder is composed of a plurality of ladder sections that attach onto one another.

9. The rotatably-engaged tree stand and ladder for access there with as described in claim 7 wherein the ladder is secured to the tree via a plurality of ladder straps.

10. A rotatably-engaged tree stand and ladder for access there with comprising:
   a pair of track straps that attach onto and encircle an outer surface of a tree at a height above ground, and upon which a seat and foot base roll thereon via wheels extending from a vertical member;
   wherein the seat and foot base are further defined with a rear surface;
   wherein a handle strap attaches onto and encircles said tree above the track straps;
   wherein the handle strap provides a plurality of handle members thereon, which is configured to be grasped via an occupant whom uses said handle members of the handle strap to manually roll the seat and foot base along the track straps so as to provide rotational movement of the seat and foot base around said tree;
   wherein the track straps are further defined as a top track strap and a bottom track strap, which are generally parallel with one another;
   wherein the seat and the foot base are generally parallel with one another, and are separated by a foot base distance;
   wherein the track straps are further defined as a track member affixed via a fastening means to a flexible strap member; wherein the track member has a "U" shape upon which wheels of the vertical member of said seat and foot base can roll therein.

11. The rotatably-engaged tree stand and ladder for access there with as described in claim 10 wherein the top track strap is separated from the bottom track strap by a track distance.

12. The rotatably-engaged tree stand and ladder for access there with as described in claim 10 wherein the foot base includes a plurality of holes thereon, which enable said occupant to see under his or her feet.

13. The rotatably-engaged tree stand and ladder for access there with as described in claim 10 wherein the handle strap is generally parallel with the track straps; wherein the handle strap is located at a handle distance above the top track strap.

14. The rotatably-engaged tree stand and ladder for access there with as described in claim 13 wherein the track straps and the handle strap each include a ratchet, which enables adjustment of a circumference of the track straps and handle strap around the tree.

15. The rotatably-engaged tree stand and ladder for access there with as described in claim 10 wherein a ladder extends from a ground surface and rests against the tree under the bottom track strap.

16. The rotatably-engaged tree stand and ladder for access there with as described in claim 15 wherein the ladder is composed of a plurality of ladder sections that attach onto one another.

17. The rotatably-engaged tree stand and ladder for access there with as described in claim 15 wherein the ladder is secured to the tree via a plurality of ladder straps.

\* \* \* \* \*